UNITED STATES PATENT OFFICE.

EDUARD FR. FELSING, OF MUNICH, GERMANY, ASSIGNOR TO MARIA WILHELMINE FELSING.

GELATIN COMPOSITION.

974,131.  Specification of Letters Patent.  Patented Nov. 1, 1910.

No Drawing.  Application filed October 15, 1909.  Serial No. 522,759.

*To all whom it may concern:*

Be it known that I, EDUARD FR. FELSING, citizen of Germany, residing at Munich, Bavaria, Germany, have invented a certain new and useful Improved Gelatin Composition; and I do hereby declare the following to be a full, clear, and exact description of the invention, such as will enable others skilled in the art to which it appertains to make and use the same.

My invention relates to a composition of matter employed in the production of films for taking photographic negatives which serve for the preparation of half tone printing plates.

It is the principal object of my invention to produce a more durable composition than any known to the present art, and by the use of said composition to enable the printing plate to be more deeply and finely etched than is now possible.

My invention consists essentially in adding to a suitable gelatin solution, a solution of uranium acetate or other uranium salt whereby the object of the invention as above defined is attained.

In preparing my improved composition of matter, I preferably proceed as follows:— 200 grams of hard gelatin are first dissolved in about 1000 cubic centimeters of water, this requiring about 24 hours; thereafter the dirty water is separated out and a corresponding amount of fresh water added. The gelatin is then melted in hot water the temperature of which should not be more than 38° C., for if the temperature is higher the solution becomes unclean and too thin. To the solution as thus prepared I then add the following substances: (1) about 5 grams of a suitable hardening medium such as alcohol; (2) 20 grams of any suitable coloring matter such as tierra de sienna; and (3) about 25 to 30 cubic centimeters of a uranium salt solution, such for example as 5 grams of uranium acetate dissolved in 100 cubic centimeters of distilled water and 10 cubic centimeters of 50% acetic acid. The entire mass is then filtered through flannel or the like. The solution is then ready to be placed upon the paper to form the film for receiving the photographic negative. The paper used which should be unsized or very nearly so is first rinsed for about one half hour in hot water of 38° C. until no air bubbles appear; it is then removed from the bath and by means of a squeegee is pressed onto a suitable plate. When the paper is thus placed a narrow strip all around the edge thereof is raised to form a shallow trough and into this trough the gelatin solution is poured, it being advisable to use about 0.15 cubic centimeters of solution for every 10 square centimeters of paper surface. The solution after being allowed to harden, is dried and is made sensitive to light by means of chromate of potassium or a like sensitizing medium. The film as thus prepared may be used for taking a photographic negative. A print may then be taken from the negative by placing the latter in contact with the sensitized surface of a printing plate or block and exposing the same to light in the usual manner. The plate is then developed, and etched in the manner well known to the art.

I have found in practice that a film prepared with a composition as above described, will last approximately three times as long as the film now ordinarily employed, and this result is due to the presence of the uranium salt in the composition.

Having thus described my invention, what I claim as new and desire to secure by Letters Patent is:—

1. A new composition of matter for the purpose herein set forth, consisting of a solution of gelatin, a hardening substance, and a solution of a uranium salt, substantially as described.

2. A new composition of matter for the purpose herein set forth, consisting of a solution of gelatin, a hardening substance, a coloring material and a solution of a uranium salt, substantially as described.

3. A composition of matter for the purpose herein set forth, comprising the following substances:—(1) two hundred grams of hard gelatin dissolved in one thousand cubic centimeters of water and then melted in hot water of not more than 38° C.; (2) approximately five grams of alcohol; (3) approximately twenty grams of a coloring medium; (4) and between twenty five and thirty cubic centimeters of a solution consisting of five grams of uranium acetate dissolved in one hundred cubic centimeters of distilled water and ten cubic centimeters of 50% acetic acid, substantially as described.

In testimony whereof I hereunto affix my signature in the presence of two witnesses.

EDUARD FR. FELSING.

Witnesses:
 LOUIS MUELLER,
 MATHILDE K. HELD.